US012653089B1

(12) United States Patent
Meng et al.

(10) Patent No.: US 12,653,089 B1
(45) Date of Patent: Jun. 16, 2026

(54) RADIATIVE COOLING-DRIVEN SYSTEM FOR AUTOMATED WATER COLLECTION AND SEED GERMINATION ENHANCEMENT IN DESERT REGIONS

(71) Applicant: Nanjing University, Nanjing (CN)

(72) Inventors: Fanzheng Meng, Nanjing (CN); Zhi Gao, Nanjing (CN); Hanning Wang, Nanjing (CN); Fusuo Xu, Nanjing (CN); Dongdong Tian, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 19/379,676

(22) Filed: Nov. 4, 2025

(30) Foreign Application Priority Data

Feb. 7, 2025 (CN) .......................... 202510134693.1

(51) Int. Cl.
| | |
|---|---|
| *A01C 1/02* | (2006.01) |
| *A01G 27/00* | (2006.01) |
| *F03D 9/34* | (2016.01) |
| *F25B 23/00* | (2006.01) |

(52) U.S. Cl.
CPC ................ *A01C 1/02* (2013.01); *A01G 27/00* (2013.01); *F03D 9/34* (2016.05); *F25B 23/003* (2013.01)

(58) Field of Classification Search
CPC ........... A01C 1/02; F03D 9/34; F25B 23/003; A01G 27/00
See application file for complete search history.

(56) References Cited

U.S. PATENT DOCUMENTS

| | | | | |
|---|---|---|---|---|
| 7,739,831 | B2 * | 6/2010 | Frounfelker | A01G 13/26 |
| | | | | 47/29.5 |
| 2017/0359968 | A1 * | 12/2017 | Anastasio | A01G 27/00 |
| 2019/0063786 | A1 * | 2/2019 | Bowman | A01G 9/246 |
| 2019/0380285 | A1 * | 12/2019 | Farley | A01G 9/026 |

FOREIGN PATENT DOCUMENTS

| | | | | |
|---|---|---|---|---|
| CN | 112523301 | A * | 3/2021 | E03F 5/10 |
| CN | 114097472 | A | 3/2022 | |
| CN | 115119674 | A | 9/2022 | |
| CN | 116591260 | A | 8/2023 | |
| CN | 221941298 | A | 11/2024 | |
| CN | 119096750 | A | 12/2024 | |

* cited by examiner

*Primary Examiner* — Magdalena Topolski
*Assistant Examiner* — Spencer T Callaway

(57) ABSTRACT

A radiative cooling-driven system for automated water collection and seed germination enhancement in desert regions includes a base. A bottom plate is fixedly inserted through a middle part of the base, a water collection cylinder is fixedly connected to an upper part of the bottom plate, a protective assembly is arranged at an upper part of the water collection cylinder, and a filter disc is fixedly connected to an inner wall of a middle part of the water collection cylinder. The present application incorporates the protective assembly. A windmill is driven to rotate during high winds, and a driving wheel and driven wheels drive winding shafts I to rotate via a drive rod. Cables are wound up, pulling protective plates to move toward the middle part of the water collection cylinder. As a result, the water collection cylinder is sealed, effectively blocking wind-blown sand from entering and preventing clogging.

5 Claims, 5 Drawing Sheets

RADIATIVE COOLING-DRIVEN SYSTEM FOR AUTOMATED WATER COLLECTION AND SEED GERMINATION ENHANCEMENT IN DESERT REGIONS

CROSS-REFERENCE TO RELATED APPLICATION

This application claims priority of Chinese Patent Application No. 202510134693.1, filed on Feb. 7, 2025, the entire contents of which are incorporated herein by reference.

TECHNICAL FIELD

The present disclosure relates to the technical field of automated water collection, and specifically to a radiative cooling-driven system for automated water collection and seed germination enhancement in desert regions.

BACKGROUND

Desertification is escalating as a global challenge. Efforts to manage desert areas via progressive vegetation establishment have achieved initial progress in containing the Taklamakan Desert. While these efforts currently form a foundational stage, the critical next step is to implement afforestation, thereby further restoring the desert ecosystem and enhancing its self-recovery capacity.

However, water scarcity is prevalent in desert regions. Many plants fail to establish or survive due to a lack of moisture, particularly during critical initial stages of germination and early growth. Therefore, providing adequate water for plants has become a major challenge in desert greening projects. Conventional irrigation techniques are not widely applicable in these regions due to water scarcity, creating an urgent need for a novel and sustainable water supply technology to support afforestation and ecological restoration. To address this challenge, the present application provides a radiative cooling-driven system for automated water collection and seed germination enhancement in desert regions, which is designed to provide essential moisture for plants in desert regions during initial growth stages.

SUMMARY

In view of the foregoing, an objective of the present disclosure is to provide a radiative cooling-driven system for automated water collection and seed germination enhancement in desert regions, thereby solving the problem of water scarcity during initial growth stages of plants.

Based on the above objective, the present disclosure provides a radiative cooling-driven system for automated water collection and seed germination enhancement in desert regions, including a base. A bottom plate is fixedly inserted through a middle part of the base, a water collection cylinder is fixedly connected to an upper part of the bottom plate, a protective assembly is arranged at an upper part of the water collection cylinder, a filter disc is fixedly connected to an inner wall of a middle part of the water collection cylinder, a cleaning assembly is arranged at an upper part of the filter disc, and a reinforcement assembly is arranged on an upper surface of the base; and a seed groove penetrates through and is disposed at a middle part of the bottom plate, ventilation holes are annularly distributed on an upper surface of the bottom plate, an outer surface of the water collection cylinder is coated with an outer coating, and an inner wall of the water collection cylinder is coated with an inner coating; and the protective assembly is covered on the upper part of the water collection cylinder, the cleaning assembly is configured to clean a surface of the filter disc, and the reinforcement assembly penetrates through the base and extends deep into a ground.

Preferably, the protective assembly includes a support frame fixedly connected to a top end of the water collection cylinder, a drive rod is movably inserted through a middle part of the support frame, a windmill is fixedly connected to a top end of the drive rod, sliding blocks are constrained to slide inside the support frame, and protective plates are fixedly connected to top ends of the sliding blocks.

Preferably, a driving wheel is sleeved over a partial outer surface of the drive rod located inside the support frame, winding shafts I are movably connected to an inner wall of the middle part of the support frame, driven wheels are fixedly connected to top ends of the winding shafts I, and the driving wheel is meshed with the driven wheels; and cables are arranged on outer surfaces of the winding shafts I, and the sliding blocks are fixedly sleeved onto middle parts of the cables.

Preferably, winding shafts II are rotatably connected to an inner wall of an end of the support frame, one end of each cable away from the winding shaft I is fixedly sleeved onto a middle part of an outer surface of each winding shaft II; and clockwork springs are arranged at two ends of the outer surface of the winding shaft II.

Preferably, the cleaning assembly includes a sleeve ring sleeved over an outer surface of a bottom end of the drive rod, the bottom end of the drive rod is rotatably connected to a middle part of the filter disc, cleaning plates are fixedly connected to an outer surface of the sleeve ring, and lower surfaces of the cleaning plates are abutted against the middle part of the filter disc.

Preferably, a threaded rod I is movably inserted through an interior of each cleaning plate, and a conical gear is fixedly connected to an end of each threaded rod I; and conical gear rings are fixedly connected to the inner wall of the water collection cylinder, with two conical gear rings arranged symmetrically above and below the conical gear.

Preferably, a discharge outlet is disposed on the inner wall of the middle part of the water collection cylinder; and push plates are movably inserted through sides of the cleaning plate, a portion of each push plate extending into the cleaning plate is threadedly connected to an outer surface of the threaded rod I, and a portion of each push plate extending outside the cleaning plate has a triangular cross-section.

Preferably, the reinforcement assembly includes spike rods movably inserted through the upper surface of the base, mounting blocks are fixedly sleeved over outer surfaces of tops of the spike rods, mounting grooves are disposed on the upper surface of the base, the mounting blocks are clamped into the mounting grooves, grooves are disposed at top ends of the spike rods, and square rods are arranged inside the grooves.

Preferably, a threaded rod II is movably connected inside each spike rod, the square rod is fixedly connected to a top end of the threaded rod II, and a threaded sleeve is threadedly connected to an outer surface of the threaded rod II; and push rods are hinged with an outer surface of the threaded sleeve, and a barbed plate is hinged with one end of each push rod away from the threaded sleeve.

Preferably, strip-shaped openings penetrate through and are disposed on the outer surfaces of the spike rods, and a top of the barbed plate is rotatably connected to an inner wall of each strip-shaped opening.

The present disclosure has the following beneficial effects.

1. The radiative cooling-driven system for automated water collection and seed germination enhancement in desert regions incorporates the protective assembly. During high winds, the wind drives the windmill to rotate, and the driving wheel and the driven wheels drive the winding shafts I to rotate via the drive rod. The cables are wound up, pulling the protective plates to move toward the middle part of the water collection cylinder. As a result, the water collection cylinder is sealed, effectively blocking wind-blown sand from entering and preventing clogging.

2. The radiative cooling-driven system for automated water collection and seed germination enhancement in desert regions incorporates the cleaning assembly. The drive rod drives the cleaning plates to rotate, thereby gathering and cleaning a small amount of sand that has fallen onto the filter disc. During the rotation of the cleaning plates, force is transmitted through the conical gears and the conical gear rings, moving the push plates. Subsequently, the accumulated sand is pushed out through the discharge outlet by these plates, thereby completing the cleaning of the filter disc.

3. The radiative cooling-driven system for automated water collection and seed germination enhancement in desert regions incorporates the reinforcement assembly. When the device is mounted, the spike rods are passed through the mounting grooves and driven into the ground. The square rods are rotated using a tool, thereby causing the threaded rods II to rotate. The threaded sleeves are moved downward and drive the push plates to move, causing the barbed plates to deploy outward. Consequently, the resistance between the spike rods and the sandy ground is increased, thereby enhancing the overall stability of the device.

BRIEF DESCRIPTION OF THE DRAWINGS

To more clearly illustrate the technical solutions in the present disclosure or in the related art, a brief description of the drawings required to be used in the embodiments is presented below. Obviously, the drawings described below are only some embodiments of the present disclosure, and for those ordinary skilled in the art, other drawings may be obtained without creative efforts.

Figure 1:
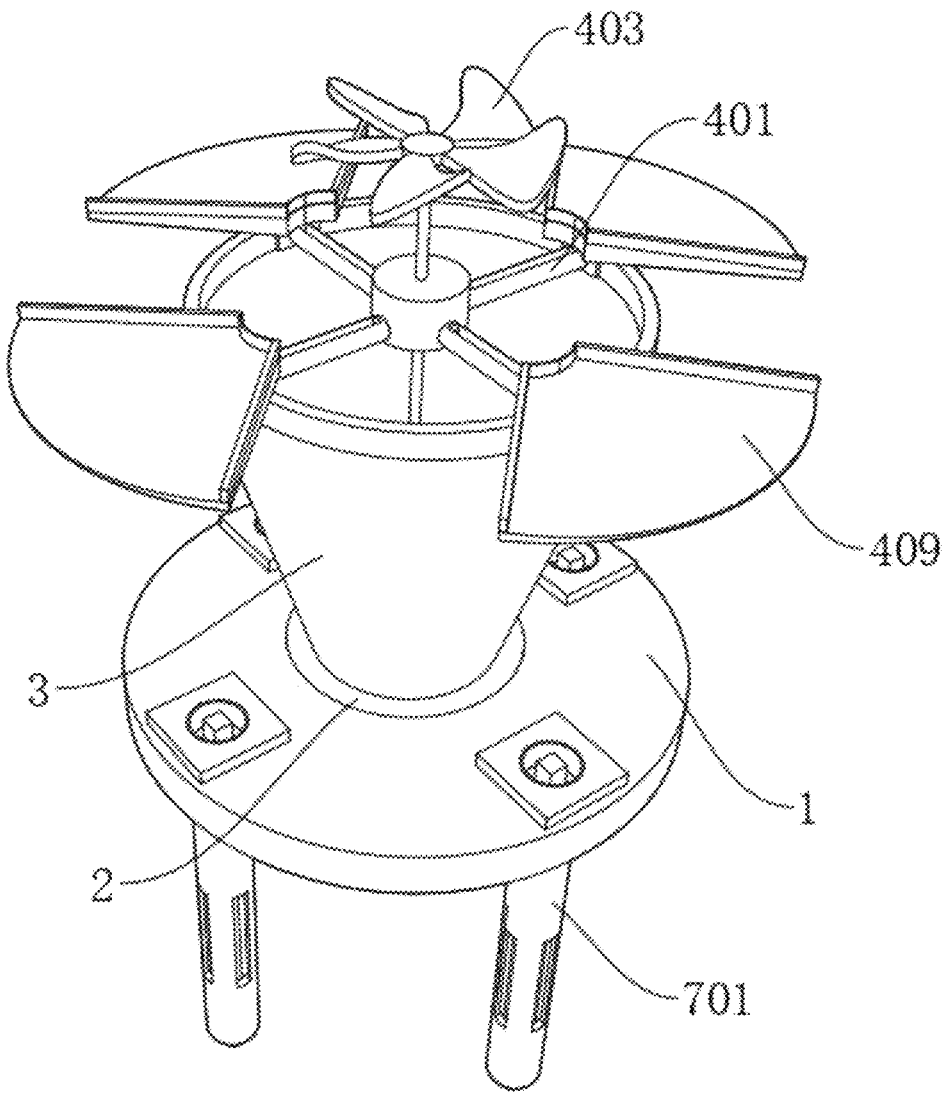
FIG. 1 is a perspective schematic view of the present disclosure.

Reference numerals and denotations thereof:

1—base; 2—bottom plate; 201—seed groove; 202—ventilation hole; 3—water collection cylinder; 301—outer coating; 302—inner coating; 401—support frame; 402—drive rod; 403—windmill; 404—driving wheel; 405—winding shaft I; 406—driven wheel; 407—cable; 408—sliding block; 409—protective plate; 410—winding shaft II; 411—clockwork spring; 5—filter disc; 601—sleeve ring; 602—cleaning plate; 603—threaded rod I; 604—conical gear; 605—conical gear ring; 606—push plate; 607—discharge outlet; 701—spike rod; 702—mounting block; 703—mounting groove; 704—square rod; 705—threaded rod II; 706—strip-shaped opening; 707—barbed plate; 708—threaded sleeve; and 709—push rod.

DETAILED DESCRIPTION

To make the objectives, technical solutions, and advantages of the present disclosure more apparent, the present disclosure is described in detail with reference to specific embodiments.

It is to be noted that unless otherwise defined, technical terms or scientific terms used in the present disclosure have the ordinary meaning as understood by those skilled in the art to which the present disclosure belongs. The terms "first," "second," and the like used in the present disclosure do not denote any order, quantity, or importance, but are used merely to distinguish different components. The terms such as "include" or "including" mean that the elements or items preceding the term encompass the elements or items listed after the term and equivalents thereof, but do not preclude other elements or items. The term "connection" or "connected" and similar expressions are not limited to physical or mechanical connections, but may also include electrical connections, whether direct or indirect. The terms "upper," "lower," "left," "right," and the like are used solely to denote relative positional relationships. When the absolute position of the described object changes, these relative positional relationships may also change accordingly.

Referring to FIGS. 1-8, a radiative cooling-driven system for automated water collection and seed germination enhancement in desert regions includes a base 1, a bottom plate 2 is fixedly inserted through a middle part of the base 1, a water collection cylinder 3 is fixedly connected to an upper part of the bottom plate 2, a protective assembly is arranged at an upper part of the water collection cylinder 3, a filter disc 5 is fixedly connected to an inner wall of a middle part of the water collection cylinder 3, a cleaning assembly is arranged at an upper part of the filter disc 5, and a reinforcement assembly is arranged on an upper surface of the base 1. Furthermore, a seed groove 201 penetrates through and is disposed at a middle part of the bottom plate 2, ventilation holes 202 are annularly distributed on an upper surface of the bottom plate 2, an outer surface of the water collection cylinder 3 is coated with an outer coating 301, and an inner wall of the water collection cylinder 3 is coated with an inner coating 302. The protective assembly is covered on the upper part of the water collection cylinder 3, the cleaning assembly is configured to clean a surface of the filter disc 5, and the reinforcement assembly penetrates through the base 1 and extends deep into the ground.

The device is mounted and fixed in the sandy ground using the reinforcement assembly. Compared with traditional spike fixation, the reinforcement assembly provides greater resistance against the sandy ground, thereby achieving enhanced overall stability. During high winds, the protective assembly is automatically driven by the wind to seal the water collection cylinder 3, effectively reducing the ingress of wind-blown sand that may cause clogging. Simultaneously, the cleaning assembly can push any sand that has fallen onto the filter disc 5 out through the discharge outlet 607.

Figure 2:
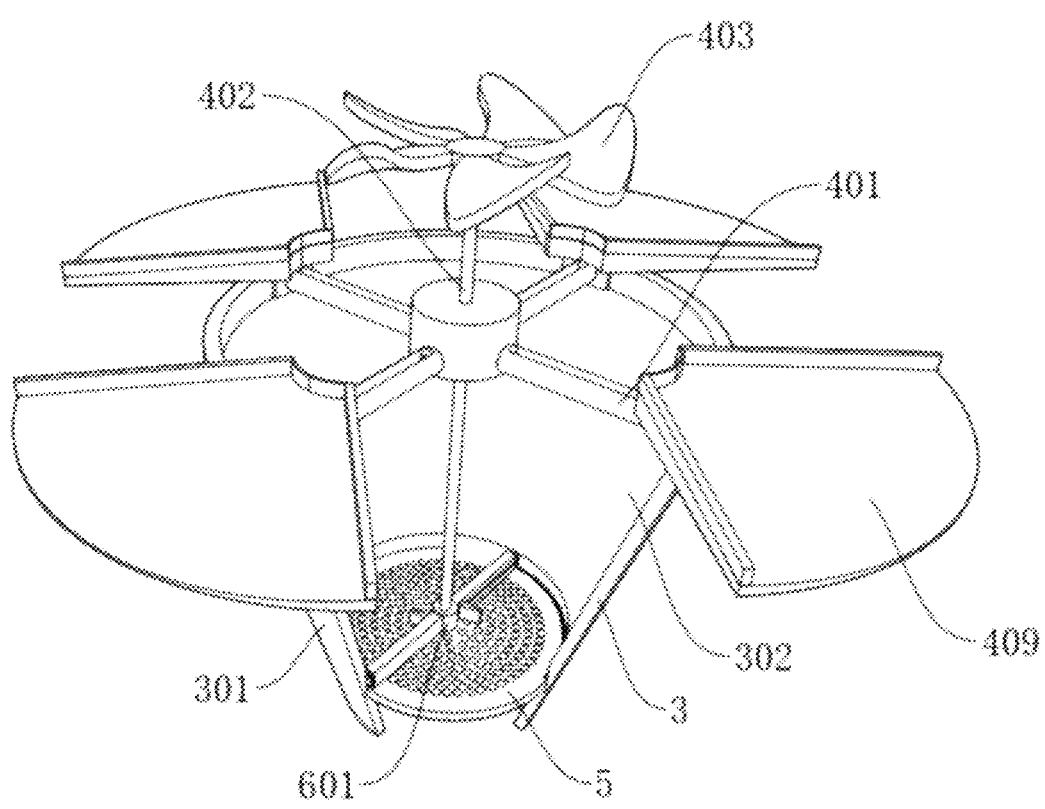
FIG. 2 is a schematic view of a partially sectioned structure of the present disclosure.
Figure 3:
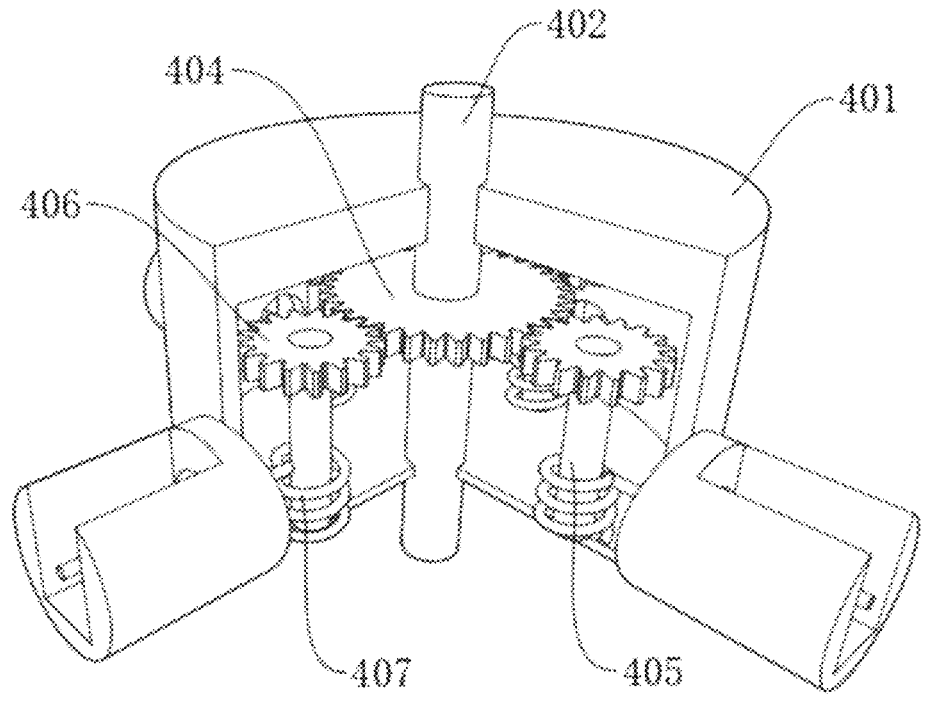
FIG. 3 is a schematic structural view of a protective assembly of the present disclosure from a first perspective.
Figure 4:
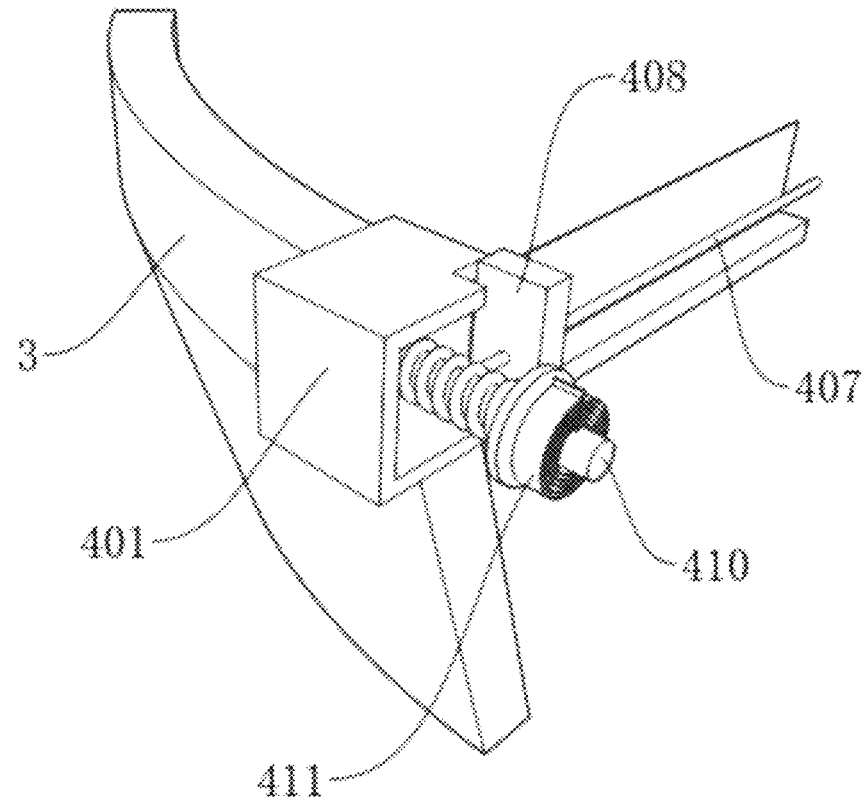
FIG. 4 is a schematic structural view of the protective assembly of the present disclosure from a second perspective.

Referring to FIGS. 2-4, the protective assembly includes a support frame 401 fixedly connected to a top end of the water collection cylinder 3, a drive rod 402 is movably inserted through a middle part of the support frame 401, a windmill 403 is fixedly connected to a top end of the drive rod 402, sliding blocks 408 are constrained to slide inside the support frame 401, and protective plates 409 are fixedly connected to top ends of the sliding blocks 408. A driving wheel 404 is sleeved over a partial outer surface of the drive rod 402 located inside the support frame 401, winding shafts I 405 are movably connected to an inner wall of the middle part of the support frame 401, driven wheels 406 are fixedly connected to top ends of the winding shafts I 405, and the driving wheel 404 is meshed with the driven wheels 406. Cables 407 are arranged on outer surfaces of the winding shafts I 405, and the sliding blocks 408 are fixedly sleeved onto middle parts of the cables 407. Winding shafts II 410 are rotatably connected to an inner wall of an end of the support frame 401, one end of each cable 407 away from the winding shaft I 405 is fixedly sleeved onto a middle part of an outer surface of each winding shaft II 410. Furthermore, clockwork springs 411 are arranged at two ends of the outer surface of the winding shaft II 410.

The wind drives the windmill 403 to rotate. Under the action of the drive rod 402, it drives the driving wheel 404 to rotate, and the driving wheel 404 drives the driven wheels 406 to rotate. Moreover, the driven wheels 406 drive the winding shafts I 405 to rotate, thereby winding up the cables 407. The cables 407 pull the sliding blocks 408 to slide inside the support frame 401, and drive the protective plates 409 to move toward the middle part of the water collection cylinder 3. During movement, the cables 407 are released from the winding shafts II 410, driving the winding shafts II 410 to rotate and stretch the clockwork springs 411. Once all the protective plates 409 are abutted against the middle part of the support frame 401, the water collection cylinder 3 is sealed, thereby blocking wind-blown sand from entering the water collection cylinder 3, and effectively reducing the risk of clogging caused by sand ingress.

Figure 5:
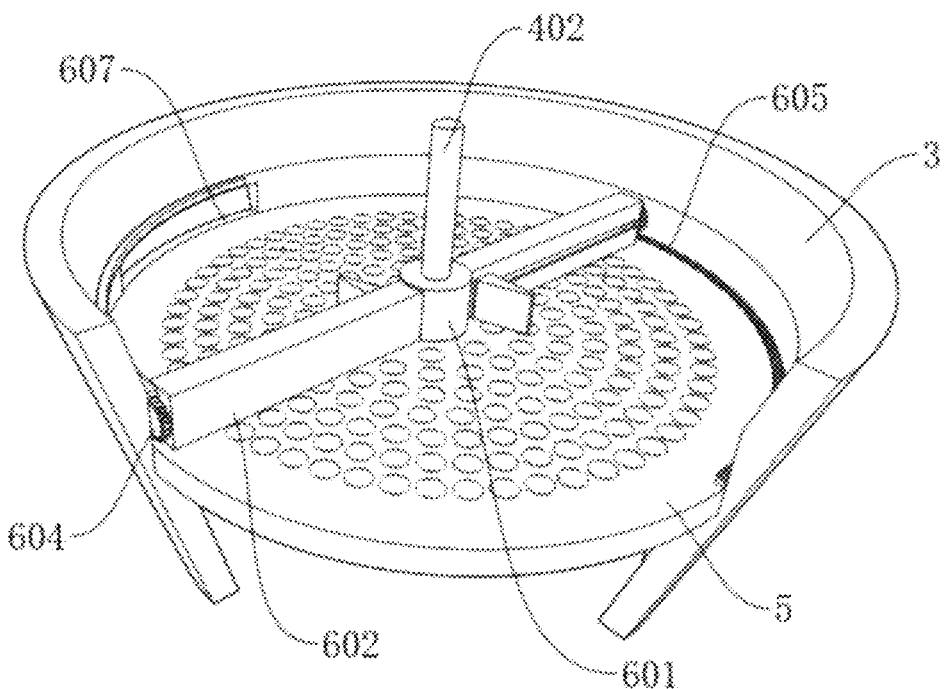
FIG. 5 is a schematic structural view of a cleaning assembly of the present disclosure from a first perspective.
Figure 6:
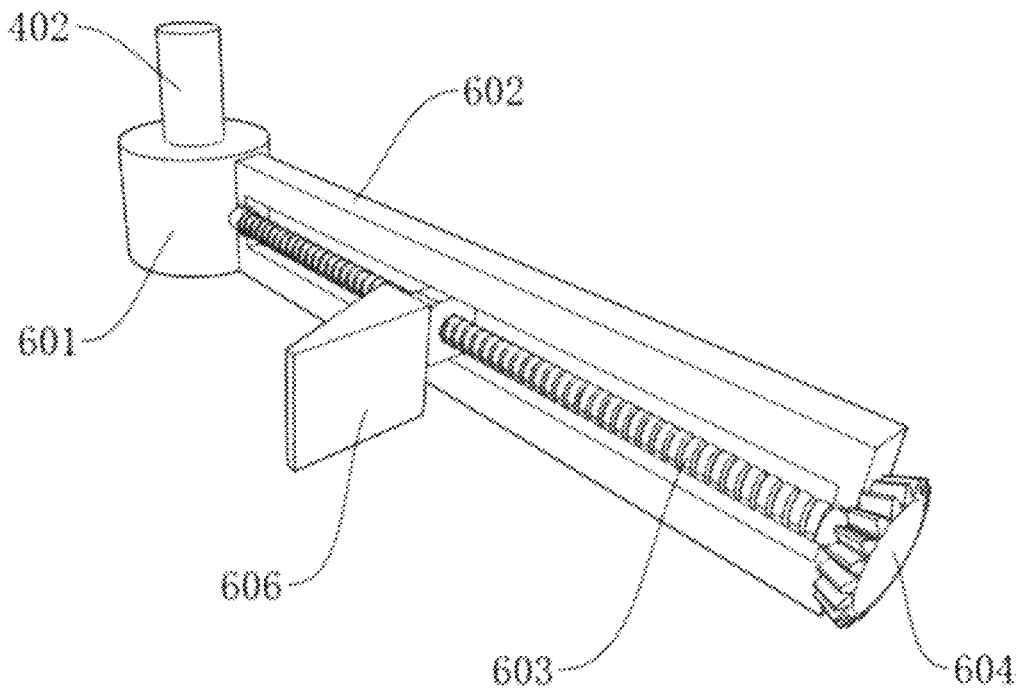
FIG. 6 is a schematic structural view of the cleaning assembly of the present disclosure from a second perspective.

Referring to FIG. 2, FIG. 5, and FIG. 6, the cleaning assembly includes a sleeve ring 601 sleeved over an outer surface of a bottom end of the drive rod 402, the bottom end of the drive rod 402 is rotatably connected to a middle part of the filter disc 5, cleaning plates 602 are fixedly connected to outer surfaces of the sleeve ring 601, and lower surfaces of the cleaning plates 602 are abutted against the middle part of the filter disc 5. A threaded rod I 603 is movably inserted through an interior of each cleaning plate 602, and a conical gear 604 is fixedly connected to an end of each threaded rod I 603; and conical gear rings 605 are fixedly connected to the inner wall of the water collection cylinder 3, with two conical gear rings 605 arranged symmetrically above and below the conical gear 604. Furthermore, a discharge outlet 607 is disposed on the inner wall of the middle part of the water collection cylinder 3. Push plates 606 are movably inserted through sides of the cleaning plate 602. A portion of each push plate 606 extending into the cleaning plate 602 is threadedly connected to an outer surface of the threaded rod I 603, and a portion of each push plate 606 extending outside the cleaning plate 602 has a triangular cross-section.

During rotation, the drive rod 402 also drives the sleeve ring 601 to rotate, which causes the cleaning plates 602 to rotate and sweep an upper surface of the filter disc 5. A small amount of sand that enters the water collection cylinder 3 is gathered and cleaned by the cleaning plates 602 on the filter disc 5. As the cleaning plates 602 move, the conical gears 604 are meshed with the upper conical gear rings 605, thereby driving the threaded rods I 603 to rotate. The rotation of the threaded rods I 603 drives the push plates 606, causing the push plates 606 to move from the middle part of the filter disc 5 toward its edges. The sand accumulated by the cleaning plates 602 is pushed outward and discharged through the discharge outlet 607, thereby completing the cleaning of the filter disc 5.

Figure 7:
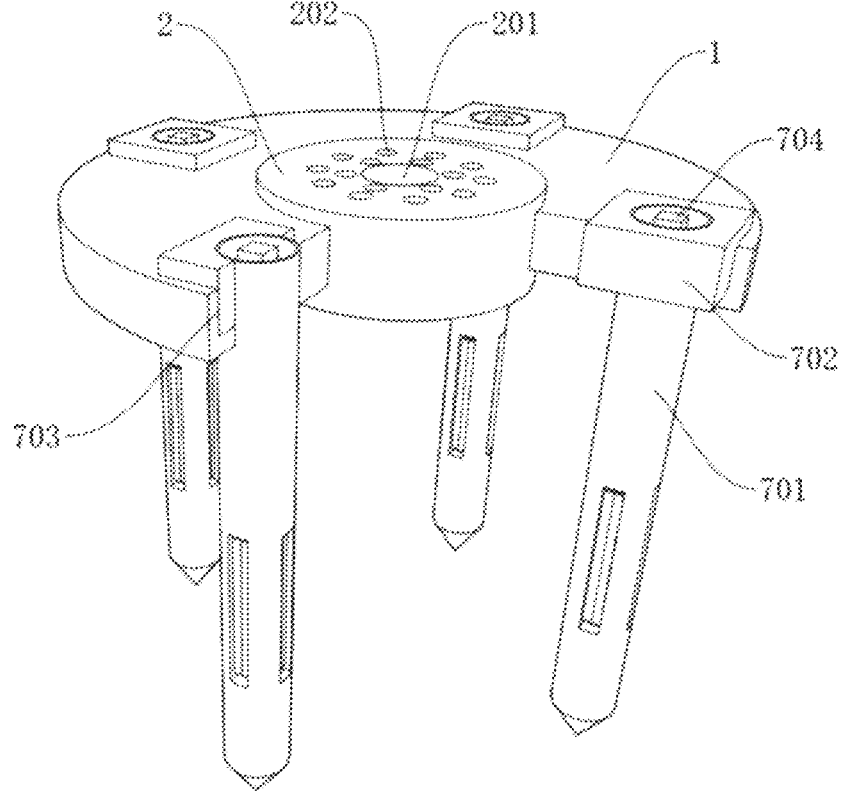
FIG. 7 is a schematic structural view of a reinforcement assembly of the present disclosure.
Figure 8:
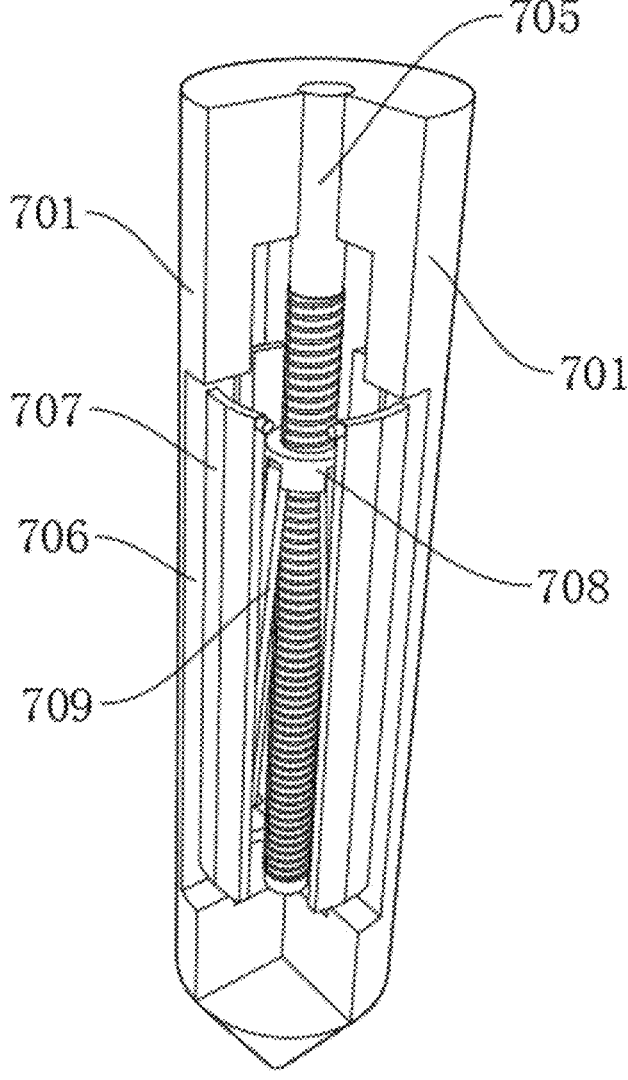
FIG. 8 is an internal schematic structural view of a spike rod of the present disclosure.

Referring to FIGS. 7-8, the reinforcement assembly includes spike rods 701 movably inserted through the upper surface of the base 1, mounting blocks 702 are fixedly sleeved over outer surfaces of tops of the spike rods 701, mounting grooves 703 are disposed on the upper surface of the base 1, the mounting blocks 702 are clamped into the mounting grooves 703, grooves are disposed at top ends of the spike rods 701, and square rods 704 are arranged inside the grooves. A threaded rod II 705 is movably connected inside each spike rod 701, the square rod 704 is fixedly connected to a top end of the threaded rod II 705, and a threaded sleeve 708 is threadedly connected to an outer surface of the threaded rod II 705. Push rods 709 are hinged with an outer surface of the threaded sleeve 708, and a barbed plate 707 is hinged with one end of each push rod 709 away from the threaded sleeve 708. Furthermore, strip-shaped openings 706 penetrate through and are disposed on the outer surfaces of the spike rods 701, and a top of the barbed plate 707 is rotatably connected to an inner wall of each strip-shaped opening 706.

The spike rods 701 penetrate through the mounting grooves 703 and are inserted into the ground until the mounting blocks 702 are fully clamped into the mounting grooves 703. The square rods 704 are rotated using a tool, and the square rods 704 drive the threaded rods II 705 to rotate. As the threaded rods II 705 rotate, the threaded sleeves 708 slide downward. During the downward movement, the threaded sleeves 708 drive the push rods 709 to move downward, causing the other ends of the push rods 709 to push the barbed plates 707 to rotate outward through the strip-shaped openings 706, forming an umbrella-like structure with the spike rods 701. At this time, the resistance between the spike rods 701 and the sandy ground is increased, thereby enhancing the overall stability of the device.

According to the technical solutions provided by the present disclosure, when the device is mounted, seeds are placed into the seed groove 201. The bottom plate 2 is placed at a designated position and fixed using the reinforcement assembly. The spike rods 701 penetrate through the mounting grooves 703 and are inserted into the ground until the mounting blocks 702 are fully clamped into the mounting grooves 703. The square rods 704 are rotated using the tool, and the square rods 704 drive the threaded rods II 705 to rotate. Since the threaded sleeves 708 are limited by the push rods 709, the threaded sleeves 708 slide downward as the threaded rods II 705 rotate. During the downward movement, the threaded sleeves 708 drive the push rods 709 to move downward, causing the other ends of the push rods 709 to push the barbed plates 707 to rotate outward through the strip-shaped openings 706, forming an umbrella-like structure with the spike rods 701. At this time, the resistance between the spike rods 701 and the sandy ground is increased, thereby enhancing the overall stability of the device. Upon completion of the mounting, the inner coating 302 and the outer coating 301 of the water collection cylinder 3 function as high-efficiency radiative cooling layers. By applying the radiative cooling principle, a surface temperature of the water collection device is reduced below the air's dew point, causing water vapor inside the water collection cylinder 3 to condense. The resulting condensate flows down through the ventilation holes 202 to the ground, moistening the soil around the seeds, thereby providing essential moisture in the desert environment.

During high-wind conditions, the wind drives the windmill 403 to rotate. Under the action of the drive rod 402, it drives the driving wheel 404 to rotate, and the driving wheel 404 drives the driven wheels 406 to rotate. Moreover, the driven wheels 406 drive the winding shafts I 405 to rotate, thereby winding up the cables 407. The cables 407 pull the sliding blocks 408 to slide inside the support frame 401, and drive the protective plates 409 to move toward the middle part of the water collection cylinder 3. During movement, the cables 407 are released from the winding shafts II 410, driving the winding shafts II 410 to rotate and stretch the clockwork springs 411. Once all the protective plates 409 are abutted against the middle part of the support frame 401, the water collection cylinder 3 is sealed, thereby blocking wind-blown sand from entering the water collection cylinder 3, and effectively reducing the risk of clogging caused by sand ingress. After the wind stops, the clockwork springs 411 rebound, causing the winding shafts II 410 to rotate in reverse and rewind the cables 407. The cables 407 move, pulling the protective plates 409 back toward the edges of the support frame 401, thereby fully exposing the top end of the water collection cylinder 3 to facilitate condensation. During rotation, the drive rod 402 also drives the sleeve ring 601 to rotate, which causes the cleaning plates 602 to rotate and sweep the upper surface of the filter disc 5. A small amount of sand that enters the water collection cylinder 3 is gathered and cleaned by the cleaning plates 602 on the filter disc 5. As the cleaning plates 602 move, the conical gears 604 are meshed with the upper conical gear rings 605, thereby driving the threaded rods I 603 to rotate. The rotation of the threaded rods I 603 drives the push plates 606, causing the push plates 606 to move from the middle part of the filter disc 5 toward its edges. The sand accumulated by the cleaning plates 602 is pushed outward and discharged through the discharge outlet 607, thereby completing the cleaning of the filter disc 5. After passing the discharge outlet 607, the conical gears 604 are meshed with the lower conical gear rings 605, driving the threaded rods I 603 to rotate in reverse, thereby retracting the push rods 709 back to the middle part of the filter disc 5.

For those skilled in the art, it is to be understood that the discussion of any of the above embodiments is merely exemplary, and is not intended to imply that the scope of the present disclosure is limited to these examples. Under the concept of the present disclosure, technical features from the above embodiments or among different embodiments may also be combined, and steps may be implemented in any order, and many other variations of different aspects of the present disclosure as described above exist, which are not provided in detail for the sake of brevity.

Therefore, any omissions, modifications, equivalent substitutions, or improvements made within the spirit and principle of the present disclosure fall within the protection scope of the present disclosure.

The invention claimed is:

1. A radiative cooling-driven system for automated water collection and seed germination enhancement in desert regions, comprising a base (1), wherein a bottom plate (2) is fixedly inserted through a middle part of the base (1), a water collection cylinder (3) is fixedly connected to an upper part of the bottom plate (2), a protective assembly is arranged at an upper part of the water collection cylinder (3), a filter disc (5) is fixedly connected to an inner wall of a middle part of the water collection cylinder (3), a cleaning assembly is arranged at an upper part of the filter disc (5), and a reinforcement assembly is arranged on an upper surface of the base (1);

a seed groove (201) penetrates through and is disposed at a middle part of the bottom plate (2), ventilation holes (202) are annularly distributed on an upper surface of the bottom plate (2), an outer surface of the water collection cylinder (3) is coated with an outer coating (301), and an inner wall of the water collection cylinder (3) is coated with an inner coating (302); and the protective assembly is covered on the upper part of the water collection cylinder (3), the cleaning assembly is configured to clean a surface of the filter disc (5), and the reinforcement assembly penetrates through the base (1) and extends deep into a ground;

the protective assembly comprises a support frame (401) fixedly connected to a top end of the water collection cylinder (3), a drive rod (402) is movably inserted through a middle part of the support frame (401), a windmill (403) is fixedly connected to a top end of the drive rod (402), sliding blocks (408) are constrained to slide inside the support frame (401), and protective plates (409) are fixedly connected to top ends of the sliding blocks (408);

the cleaning assembly comprises a sleeve ring (601) sleeved over an outer surface of a bottom end of the drive rod (402), the bottom end of the drive rod (402) is rotatably connected to a middle part of the filter disc (5), cleaning plates (602) are fixedly connected to outer surfaces of the sleeve ring (601), and lower surfaces of the cleaning plates (602) are abutted against the middle part of the filter disc (5);

the reinforcement assembly comprises spike rods (701) movably inserted through the upper surface of the base (1), mounting blocks (702) are fixedly sleeved over outer surfaces of tops of the spike rods (701), mounting grooves (703) are disposed on the upper surface of the base (1), the mounting blocks (702) are clamped into the mounting grooves (703), grooves are disposed at top ends of the spike rods (701), and square rods (704) are arranged inside the grooves; and a threaded rod II (705) is movably connected inside each spike rod (701), the square rod (704) is fixedly connected to a top end of the threaded rod II (705), and a threaded sleeve (708) is threadedly connected to an outer surface of the threaded rod II (705); and push rods (709) are hinged with an outer surface of the threaded sleeve (708), and a barbed plate (707) is hinged with one end of each push rod (709) away from the threaded sleeve (708); and strip-shaped openings (706) penetrate through and are disposed on the outer surfaces of the spike rods (701), and a top of the barbed plate (707) is rotatably connected to an inner wall of each strip-shaped opening (706).

2. The radiative cooling-driven system for automated water collection and seed germination enhancement in desert regions according to claim 1, wherein a driving wheel (404) is sleeved over a partial outer surface of the drive rod (402) located inside the support frame (401), winding shafts I (405) are movably connected to an inner wall of the middle part of the support frame (401), driven wheels (406) are fixedly connected to top ends of the winding shafts I (405), and the driving wheel (404) is meshed with the driven wheels (406); and cables (407) are arranged on outer surfaces of the winding shafts I (405), and the sliding blocks (408) are fixedly sleeved onto middle parts of the cables (407).

3. The radiative cooling-driven system for automated water collection and seed germination enhancement in desert regions according to claim 1, wherein winding shafts II (410) are rotatably connected to an inner wall of an end of the support frame (401), one end of each cable (407) away from the winding shaft I (405) is fixedly sleeved onto a middle part of an outer surface of each winding shaft II (410); and clockwork springs I (411) are arranged at two ends of the outer surface of the winding shaft II (410).

4. The radiative cooling-driven system for automated water collection and seed germination enhancement in desert regions according to claim 1, wherein a threaded rod I (603) is movably inserted through an interior of each cleaning plate (602), and a conical gear (604) is fixedly connected to an end of each threaded rod I (603); and conical gear rings (605) are fixedly connected to the inner wall of the water collection cylinder (3), with two conical gear rings (605) arranged symmetrically above and below the conical gear (604).

5. The radiative cooling-driven system for automated water collection and seed germination enhancement in desert regions according to claim 4, wherein a discharge outlet (607) is disposed on the inner wall of the middle part of the water collection cylinder (3); and push plates (606) are movably inserted through sides of the cleaning plate (602), a portion of each push plate (606) extending into the cleaning plate (602) is threadedly connected to an outer surface of the threaded rod I (603), and a portion of each push plate (606) extending outside the cleaning plate (602) has a triangular cross-section.

* * * * *